Oct. 27, 1959 C. F. BALDWIN 2,910,679
SLEEP PREVENTING DEVICE
Filed June 20, 1956
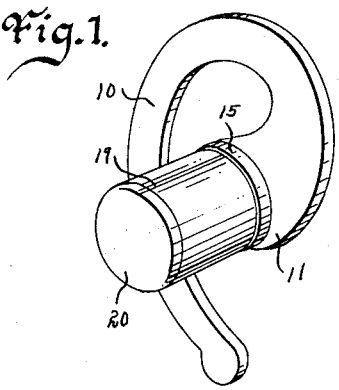
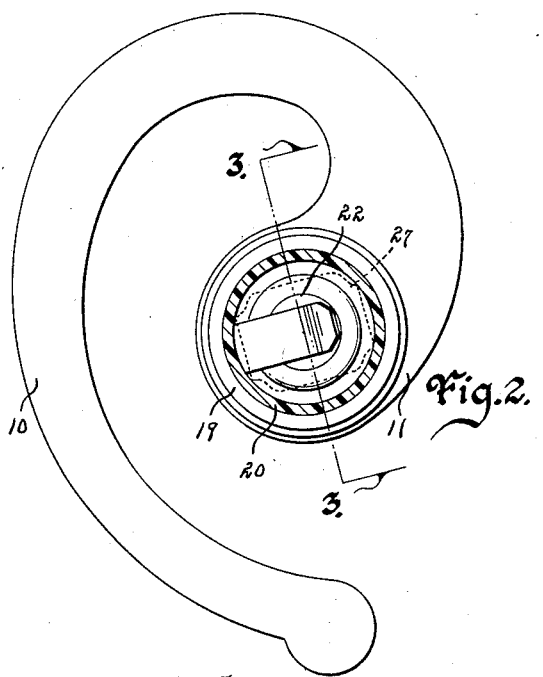
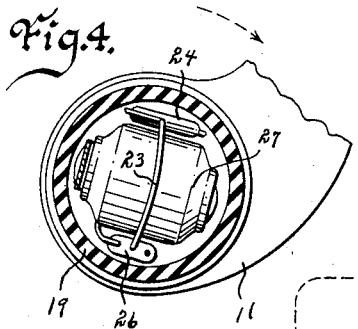
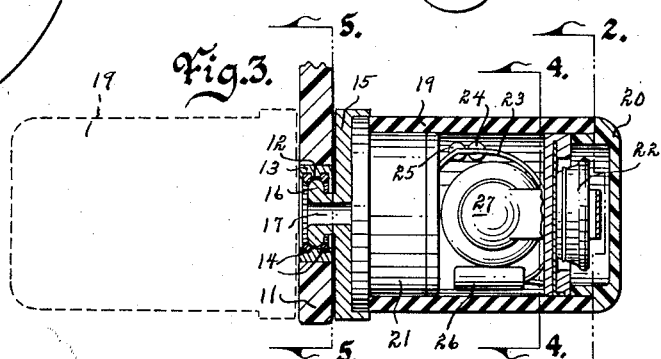
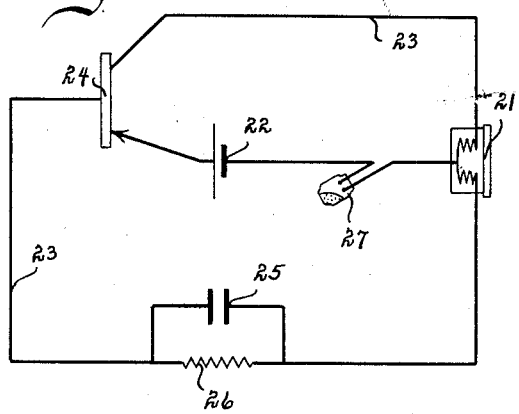
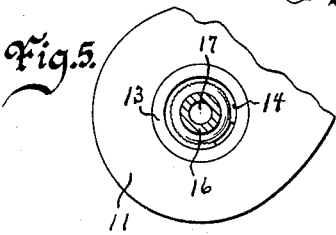
Inventor
Carroll F. Baldwin
by M. Talbert Dick
Attorney
Witness
Edward P. Seeley

United States Patent Office 2,910,679
Patented Oct. 27, 1959

2,910,679

SLEEP PREVENTING DEVICE

Carroll F. Baldwin, Des Moines, Iowa

Application June 20, 1956, Serial No. 592,527

1 Claim. (Cl. 340—213)

This invention relates to an audible signalling means and more particularly to a device for preventing vehicle drivers from falling asleep at the steering wheel of a vehicle. The present application is an improvement over the device disclosed in my application for United States Letters Patent Serial No. 537,936, filed October 3, 1955, on a device for preventing drivers from falling asleep.

One of the hazards of driving vehicles such as automobiles, trucks, busses, airplanes, and like, is that of accidentally falling asleep thereby endangering lives and property. This is particularly true in piloting airplanes and driving trucks. In the matter of airplane piloting, there is no possibility of parking and taking a nap such as might be possible with a land vehicle. Also in an airplane there is no "road path" watching and the uniform constant drone of the engine or engines is most conducive to drowsiness. In the matter of driving a truck, a great deal of long hauls are at night. While most companies operating a fleet of trucks desire that when a driver gets sleepy, he stop and sleep for a half hour or hour, the trouble is, however, that the driver usually gets drowsy between towns, pulls to the side of the road, goes to sleep, and doesn't awaken until many hours thereafter. If, on the other hand, the driver can keep awake until he reaches a town, he will not only have a safe place to park the vehicle, but most town night marshals will waken him on their next trip around as a courtesy.

Therefore, one of the principal objects of my invention is to provide a noise making device that will automatically sound a warning when the head of the user nods forwardly.

A further object of this invention is to provide a sleep alarm device that is of one portable unit and worn on the head of one liable to fall asleep while driving a vehicle.

More specifically the object of my invention is to provide a sleep inhibiting device that is compact, light, and may be worn attached to one ear of the user.

A still further object of this invention is to provide an anti-sleep device that may be easily and quickly adjusted as to the degree of head tilt necessary to place the device into alarm operation.

Still further objects of my invention are to provide a head worn sleep awakening device for vehicle drivers that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of my unit ready for use,

Fig. 2 is an enlarged cross sectional view of the device taken on line 2—2 of Fig. 3, Fig. 3 is an enlarged longitudinal sectional view of the noise making portion of my alarm and is taken on line 3—3 of Fig. 2, Fig. 4 is an enlarged cross sectional view of the device taken on line 4—4 of Fig. 3, Fig. 5 is a cross sectional view of my anti-sleep device taken on line 5—5 of Fig. 3, and Fig. 6 is a diagrammatical electrical wiring plan of the device with parts shown in symbol.

As herebefore indicated my alarm device is worn around one ear of the user as distinguished from head sets having a head engaging band for supporting the electrical unit adjacent an ear or ears.

The numeral 10 designates the base of my device which is in the form of an open C to form an ear engaging hook. The main length of this member 10 embraces the top, rear, and bottom of the ear stub of the user and back of the ear wing. I have used the numeral 11 to designate the upper free end portion of the member 10, and which is curved downwardly and rearwardly to extend over the ear opening of the user. Extending through this portion 11 is an opening 12 carrying a metal eye 13. Imbedded in this eye 13 are two spaced apart serrated split spring rings 14, as shown in Fig. 3. The numeral 15 designates a base housing having a knob portion 16 formed on its outer center and adapted to snap into the member 13 in the space between the two yieldable rings 14. By this arrangement the base member 15 is detachably secured to the member 10 and is capable of rotation independent of the member 10. The outer periphery of the knob 16 may be serrated also, as shown in Fig. 5, for yieldingly preventing the accidental rotation of the member 13 relative to the ear engaging and supporting member 10. The numeral 17 designates a passageway extending through the knob portion 16 and the base 15. The numeral 19 designates a continuous circular wall secured to the base 15. The numeral 20 designates a cap for detachably closing the outer end of the member 19. Obviously the parts 15, 19 and 20 provide a housing for my controllable electrically actuated sound mechanism and which I will now describe in detail.

The numeral 21 designates an ordinary electrically operated audible phone capable of producing a high pitched tone when electrically connected to a suitable source of electric energy. Any type electric battery may be used, but I prefer the small button type mercury cell type designated by the numeral 22. The numeral 23 designates the electric circuit imposed in which is the audio phone 21 and battery 22, as shown in Fig. 6. Also imposed in the circuit is the transistor 24, condenser 25, and the resistor 26. The numeral 27 designates a mercury switch imposed in the circuit between the battery and one contact of the phone. All of the parts 21, 22, 24, 25, 26 and 27 and the circuit 23 are inside the housing. The mercury tube switch 27 is rigidly secured inside the housing and arranged transversely of the axis of rotation of the housing as shown in Fig. 4. The phone 21 communicates with the passageway 17 as shown in Fig. 3.

The practical operation of the device is as follows:

The hook portion 10 is hooked around the ear of the user with the portion 11 over the ear opening. The head of the user is held in an upright vertical position and the housing rotated upwardly and backwardly until the mercury in the mercury switch flows backwardly and free of the two contact points in the switch. When this happens the circuit is broken and no noise alarm will emit from the phone. However, if the head of the user is tilted forwardly and downwardly (such as would happen if the user were to nod with oncoming sleep), the mercury in the switch would flow forwardly and downwardly by gravity, close the circuit and thereby cause the alarm means to function. This high pitched noise level from the audio phone will instantly awaken the nodding sleepy user of the device. Obviously, the degree of nod of the head to close the circuit will depend upon the position of rotation of the housing relative to the supporting base 10. The moment the head of the user assumes an erect position, the circuit will be broken resulting in the silencing of the device. Thus, my device is automatic and when once adjusted requires no further attention except an occasional battery replacement.

It is a simple matter to use the alarm means on either ear. In the drawings I show it positioned on the support 10 for the right ear. However, to use the device on the left ear it is merely necessary to snap the housing into the opening 12 from the opposite side of the base portion 11, as shown by broken lines in Fig. 3.

My entire device is of light weight material and inasmuch as it only has one ear of the user for support, a hat, cap or like, may be worn without interference.

While I have described the device as particularly adapted as a safety device for vehicle drivers, it may be used under any condition where it is desirable or necessary to keep the user from falling asleep.

Some changes may be made in the construction and arrangement of my sleep preventing device without departing from the real spirit and purpose of my invention, and it is my intention to cover by my claim, any modified forms of structure or use of mechanical equivalents which may be reasonably included within their scope.

I claim:

In a sleep alarm device, an ear hook member adapted to detachably extend around the root of the ear of the user and having a portion adapted to extend over the ear opening; said portion having a hole, a housing having a lug rotatably extending into said hole, frictionally engaging the wall of said hole and detachable from said hole, an electrical noise producing means, a source of electrical energy, an electric circuit connecting said noise producing means to said source of electric energy, and a mercury switch imposed in said electric circuit; said noise producing means, said source of electrical energy, said electric circuit, and said switch, all confined in said housing.

References Cited in the file of this patent

UNITED STATES PATENTS

| | | |
|---|---|---|
| 2,151,706 | Lieber | Mar. 28, 1939 |
| 2,196,543 | Anderson | Apr. 9, 1940 |
| 2,713,159 | Morrison | July 12, 1955 |
| 2,754,497 | Wolpert | July 10, 1956 |